Figure 1:
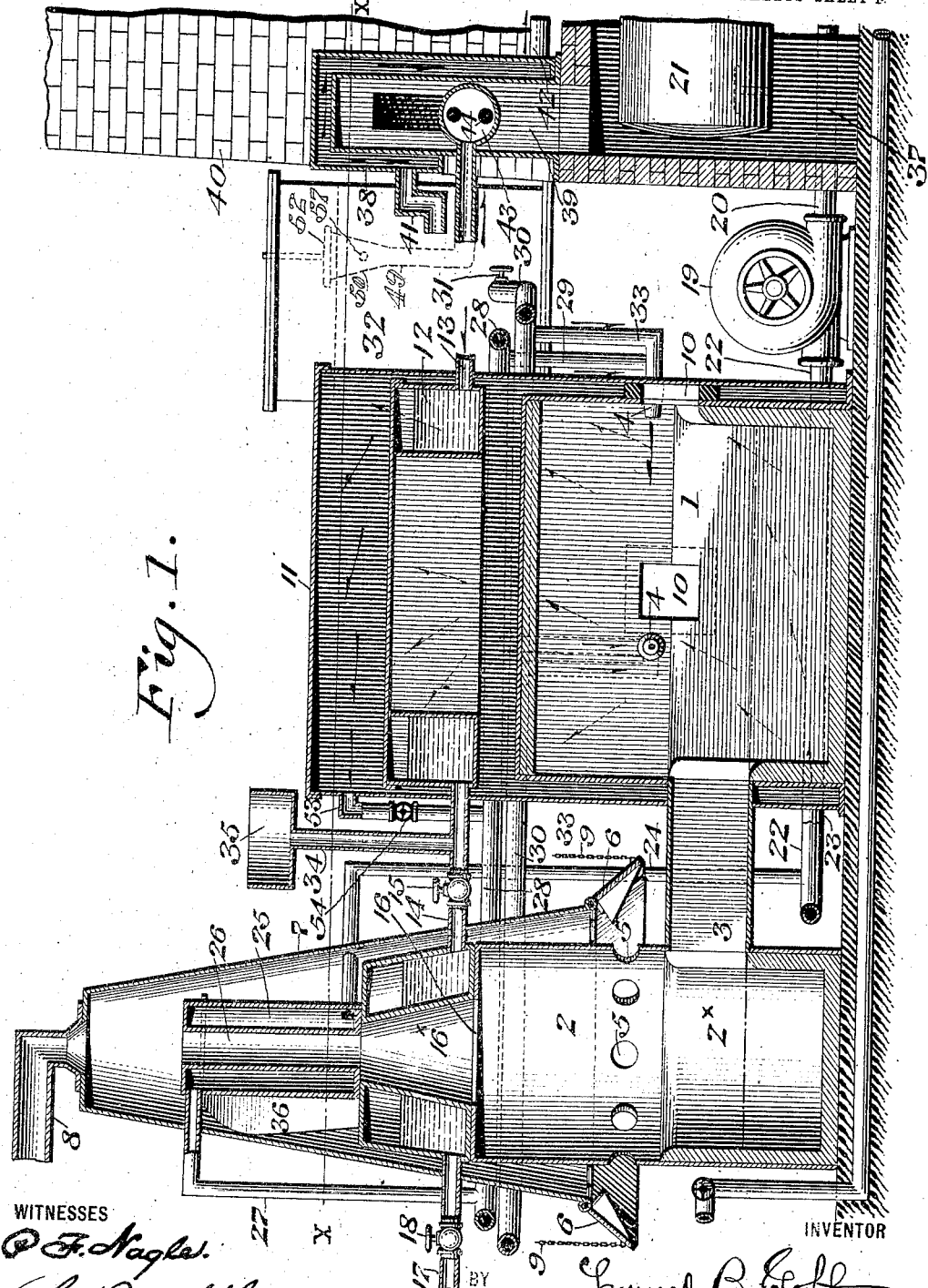

S. B. GOFF.
GLASS FURNACE.
APPLICATION FILED JULY 2, 1910.

1,013,486.

Patented Jan. 2, 1912.
2 SHEETS—SHEET 1.

WITNESSES
O. F. Nagle.
L. Douville.

INVENTOR
Samuel B. Goff.
BY Niederheim Fairbank
ATTORNEYS

S. B. GOFF.
GLASS FURNACE.
APPLICATION FILED JULY 2, 1910.
1,013,486.
Patented Jan. 2, 1912.
2 SHEETS—SHEET 2.
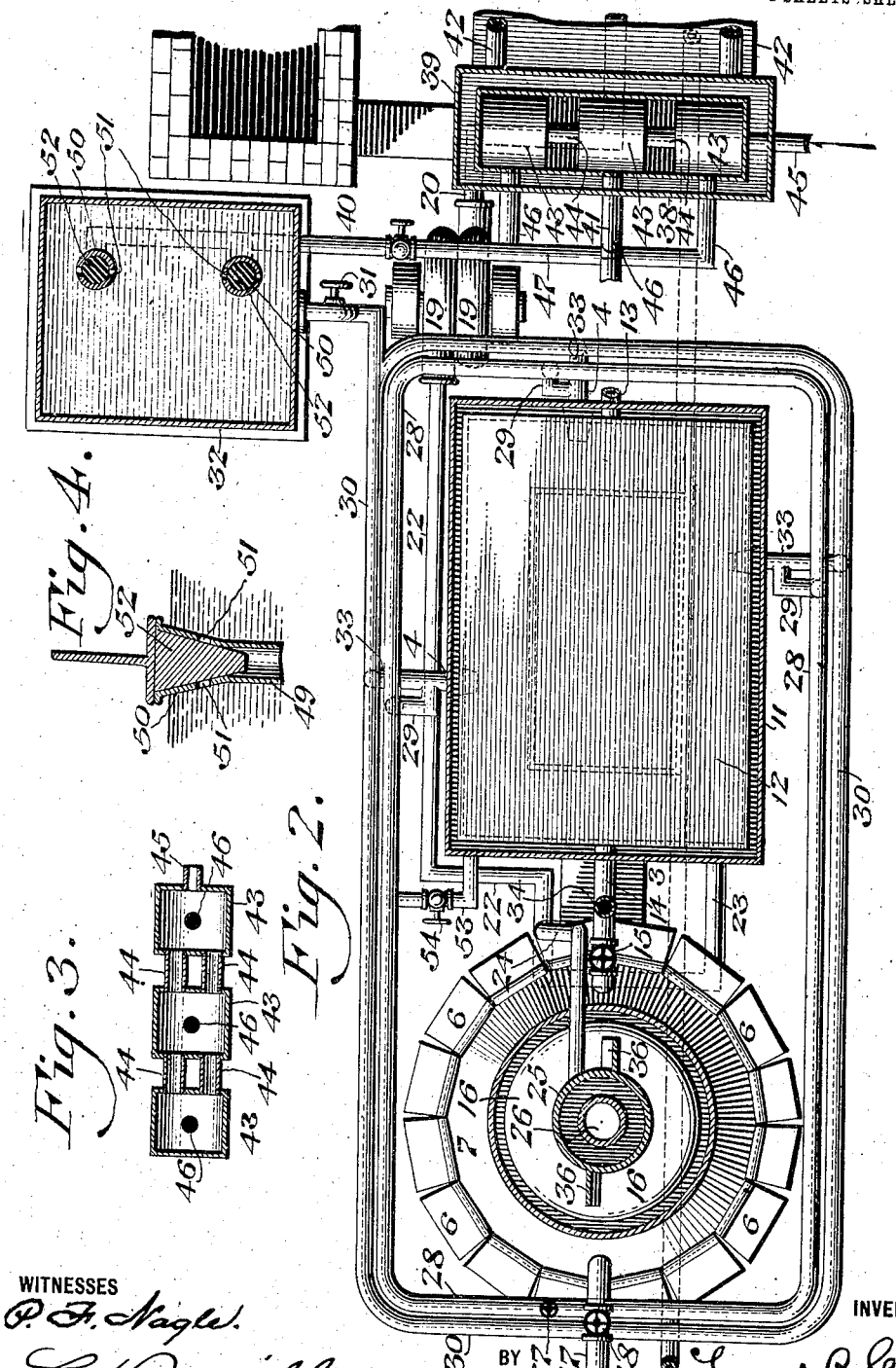
WITNESSES
INVENTOR
Samuel B. Goff
ATTORNEYS

UNITED STATES PATENT OFFICE.

SAMUEL B. GOFF, OF CAMDEN, NEW JERSEY.

GLASS-FURNACE.

1,013,486.  Specification of Letters Patent.  Patented Jan. 2, 1912.

Application filed July 2, 1910. Serial No. 570,105.

*To all whom it may concern:*

Be it known that I, SAMUEL B. GOFF, a citizen of the United States, residing in the city and county of Camden, State of New Jersey, have invented a new and useful Glass-Furnace, of which the following is a specification.

My invention consists of an improved furnace in which the waste heat is employed to preheat air or water.

It further especially consists of a glass furnace in which the waste heat is utilized to heat water and air.

It further consists of such furnace constructed for the use of a liquid fuel and in which the heat of the waste gases and products of combustion are utilized for heating water and the air, and liquid fuel employed in the furnace.

It further consists of forced draft provision for the air for the furnaces.

It further consists of other novel features of construction, all as will be hereinafter fully set forth.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a longitudinal vertical section of a glass furnace and its accessories embodying my improvements. Fig. 2 represents a horizontal section on the line $x$—$x$ Fig. 1. Fig. 3 represents a sectional detail view of the air heater for the oil reservoir. Fig. 4 represents a sectional detail view of the controlling device for the hot air inlet into the tank.

Similar numerals of reference indicate corresponding parts in the figures.

Referring to the drawings:—my apparatus embodies a melting furnace 1, in which the metal is melted, and a cupola-shaped furnace 2 having a glass pot $2^x$ into which the molten metal flows from the melting furnace through a duct 3 connecting the two furnaces. The melting furnace has a number of burners or twyers 4, in which air and liquid fuel are mixed and vaporized to issue as flames playing against the metal in the melting furnace. The cupola 2 is cylindrical and has glory-holes 5 through which access to the molten metal may be had for the blow pipes, and said glory-holes have hinged shields 6 partly covering them to protect the workmen around the furnace against the intense heat issuing through the glory-holes. Said shields are preferably hinged in the lower flared edge of a conical hood 7, which incloses the upper portion of the cupola and has a pipe 8 at its upper end to carry off the hot gases from the cupola. Suitable chains 9 connected to the shields serve to raise the shields when the blower inserts his blow-pipe through a glory-hole. The melting furnace is preferably rectangular and has openings 10 in its sides for feeding the metal to be melted. Said furnace is inclosed within a rectangular casing 11, so as to form an air space, and a quadrangular water chamber 12 is supported in the space above the furnace so that the water within the same may be heated. Said water chamber receives its supply through an inlet pipe 13, connected to a suitable supply, and discharges through a pipe 14 having a globe-valve 15, or similar control into an annular water chamber 16, upon the top of the cupola furnace and having a conical inner wall forming a conical central duct $16^x$ through which the gases from the cupola pass. An outlet pipe 17 having a globe-valve 18, or similar control, extends from the annular water heating chamber to conduct the heated water to whatever it may be needed.

A double blower 19 is suitably driven and one blower has a pipe 20 through which forced draft may be supplied to the furnace of a steam boiler 21, while the discharge of the other blower passes into a pipe 22 circling around the melting furnace and entering the hot air space around the same at 23. A branch pipe 24 rises from the blast-pipe 22, and enters the lower end of an annular chamber 25 surrounding a flue 26, forming a continuation of the conical duct $16^x$, and the blast heated in this chamber passes out at its top through a pipe 27 which passes downward to a pipe 28 which completely surrounds the melting and cupola furnaces, and is connected by branch pipes 29 to the burners or twyers 4. A pipe 30 provided with a globe valve 31, or similar control, extends from an oil tank 32, and passes around the furnaces within the heating zone of the same and is connected to the burners or twyers 4 by means of branch pipes 33.

A riser 34 is provided for the hot water pipe 14, between the two hot water chambers, and said riser has a cup 35 at its upper end, and serves to relieve excess pressure in the chambers and the pipes connected therewith.

Spiral vanes 36 are arranged in the space between the conical hood over the cupola furnace and the annular hot air chamber to retard the upward flow of hot air in such space and cause it to give off the greatest amount of heat possible to the hot air chamber.

A boiler furnace 37 and steam boiler 21, already referred to, is employed in connection with the glass furnace, and a double hollow casing 38 surrounds the flue 39, which carries the products of combustion from the furnace to the stack 40. Said casing has an air intake 41, at one side, and pipes 42 lead from the other side of the casing to the fire box of the furnace to supply hot air to the same. Drums 43 are horizontally supported within the space surrounded by the casing, and are connected by pipes 44. Air is admitted to said drums through an intake 45, and pipes 46 lead from the several drums to a pipe 47, which enters the oil tank and has risers 49, which terminate in conical seats 50, at about the oil level in the tank. Said conical seats have lateral openings 51, and conical plugs 52 fit upon the seats and may be raised to allow hot air to escape into the tank to heat the oil.

A pipe 53 leads from the hot air chamber surrounding the melting furnace down to the air pipe 28, and has a globe valve 54, or similar control.

When the blower is started, air will be forced into the space surrounding the melting furnace, and will be intensely heated, and such heat will be maintained in the blast pipes 22 and 28 on account of the close proximity of the same to the furnace. A part of the blast from the blower passes through the annular chamber above the cupola furnace and is heated there, and thence passes to the pipe 28, and the branches leading to the burners. Intensely hot air will thus be fed to the burners, so that the liquid fuel will quickly be vaporized and ignited. It may not be necessary to heat the oil, but in cold weather it may be desirable to raise the temperature of the fuel to cause it to vaporize freely, and the function of the oil heating apparatus is then of great utility and advantage. The water heating device in the apparatus may be used as a feed water heater for the boiler besides furnishing hot water for other purposes.

In my improved apparatus, what otherwise would be waste heat is utilized to facilitate and increase combustion of the liquid fuel, whereby considerable economy in the operation of the furnace is attained. This waste heat is also utilized for heating the feed water of a boiler or for other purposes, so that the waste heat in a glass furnace which otherwise would be wasted in the atmosphere without performing any useful function, may be put to a useful purpose and accomplish useful and economic results. On account of the air and fuel pipes encircling the furnaces and being within the zone of heat radiating from the same, said pipes and the fuel and air conducted by the same will retain their heat during transit from the heating apparatus to the burners.

Having thus described my invention what I claim as new and desire to secure by Letters Patent, is:—

1. In an apparatus of the character stated, a melting furnace, a casing surrounding the same and forming a hot air space provided with an air inlet, burners in the furnace, a fuel supply pipe encircling the furnace within the heating zone of the same and connected to the burners, a fuel tank communicating into said supply pipe and having means for heating it and an air pipe communicating with the hot air space and connected to supply the burners.

2. In an apparatus of the character stated, a melting furnace, a casing surrounding the same and forming a hot air space, a blower connected to discharge into said space, burners in the furnace, a fuel supply pipe encircling the furnace and connected to said burners, a fuel tank communicating into said supply pipe and having means for heating it and an air pipe communicating with the hot air space, encircling the furnace within the heating zone of the same and connected to supply the burners.

3. In an apparatus of the character stated, a melting furnace, a cupola-shaped furnace forming a glass pot in its lower portion and provided with glory-holes above said pot, a duct connecting the melting furnace and the glass-pot, a conical hood around and above the upper part of said cupola shaped furnace, and having an outlet at its upper end, and shields hinged at the edge of such hood and extending over the glory-holes.

4. In an apparatus of the character stated, a cupola-shaped furnace forming a glass pot in its lower portion and having glory-holes, a conical hood around and above the upper portion of said furnace, an annular water-chamber on the top of said furnace and having a central duct communicating with the furnace and having water inlet and outlet, and an annular air chamber on the top of said water chamber and having a central duct communicating with said former duct and having air inlet and outlet, and spiral vanes between the sides of said air chamber and the hood to form spiral passages around such chamber.

SAMUEL B. GOFF.

Witnesses:
N. BUSSINGER,
C. D. McVAY.